Patented Dec. 9, 1952

2,621,182

UNITED STATES PATENT OFFICE 2,621,182

2-CARBOXYMETHYLTHIO-4-AMINOPYRIMIDINE AND METHOD OF MAKING

George H. Hitchings, Tuckahoe, and Peter Byrom Russell, Crestwood, N. Y., assignors to Burroughs Wellcome & Co. (U. S. A.) Inc., Tuckahoe, N. Y., a corporation of New York No Drawing. Application September 9, 1948, Serial No. 48,528

11 Claims. (Cl. 260—247.1)

This invention is concerned with the preparation of carboxymethylthio substituted pyrimidine compounds and has for an object to provide new compositions of the above type and a novel and improved method of making the same.

Another object is to provide pharmaceutically important derivatives of the above substances which are also useful as intermediaries in the preparation of related pyrimidine compounds.

A main difficulty in synthesizing 2,4 substituted pyrimidines resides in introducing diverse groupings at the 2 and 4 positions of the pyrimidine ring due to the nearly equivalent reactiveness of precursors usually employed at these positions (Johnson & Hilbert, J. Am. Chem. Soc. 52, 1152, 1930 cf. Levene & Bass, The Nucleic Acids, New York, 1931, page 71). In the copending applications, Ser. Nos. 33,677 and 33,678, filed June 17, 1948 by the present applicants, selectivity at these positions is obtained in forming 4-aminopyrimidines by reacting 2,4 dithiopyrimidines with certain primary and secondary amines to form the corresponding 2 thiol-4-aminopyrimidines.

The present application is more particularly concerned with the formation of new derivatives having unusual properties by treatment of the 2-thiol group of the pyrimidine ring. In general, treatment of a 2-thiolpyrimidine with an aqueous solution of chloracetic acid results in eliminating the sulfur atom at the 2 position by hydrolysis with the formation of a 2-hydroxypyrimidine.

We have found according to the present invention that new and valuable derivatives are produced by treating a 2-thiol-4-aminopyrimidine with chloracetic acid to form a 2-carboxymethylthio-4-aminopyrimidine. The isolation of the 2-carboxymethylthio derivative is contrary to theoretical prediction and surprising in view of the expected formation of the 2-hydroxy derivative by conventional methods.

The method of forming the new compositions according to the present invention is preferably characterized as follows:

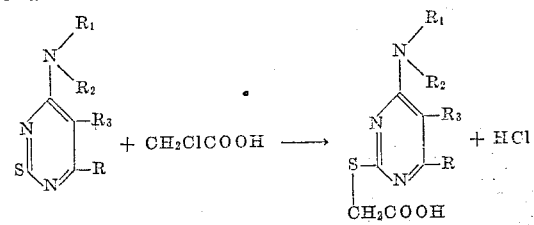

wherein R is H, alkyl, aryl, aryl and aralkyl substituted by Cl, Br, alkyl or alkoxyl groupings and the like containing not over eight carbon atoms, $R_1$ is H, alkyl, aryl, aralkyl, substituted aryl and aralkyl, hydroxyalkyl and dialkylamino alkyl and the like containing not over twenty carbon atoms, $R_2$ is H or methyl, $R_1$ and $R_2$ may together constitute a cyclic system, $R_3$ has the same value as R containing not over ten carbon atoms, and $R_3$ and R may form together the arms of a cyclic system and where at least one of the substituents $R_2$ and $R_3$ is hydrogen.

The desired 2-carboxymethylthio-4-aminopyrimidine derivative may be readily formed by merely heating the selected reactant with chloracetic acid under suitable conditions of temperature and pressure, depending on the nature of the 2-thiol-4-aminopyrimidine, until the reaction is complete. Generally speaking, the 2-carboxymethylthio derivative separates as a free base, but in case the 4-amino group is tertiary the product is formed as a hydrochloride. In most instances the reactants are mixed together in aqueous solution and heated under reflux conditions whereupon the 2-thiol-4-aminopyrimidine dissolves in the solution. In some cases after solution occurs the 2-carboxymethylthio derivative separates from the still boiling solution without further treatment. Where the 2-thiol-4-aminopyrimidine is tertiary as to the amino group, the 2-carboxymethylthio derivative often separates as the hydrochloride. The product may be recovered from the solution by crystallization on standing, or may be chilled to accelerate recovery of the product.

The new compositions have valuable pharmaceutical and bactericidal properties and are useful intermediaries in the preparation of other aminopyrimidine derivatives. For example, the 2-carboxymethylthio derivative, which is relatively stable to dilute acid, is quantitatively hydrolyzed to the 2-hydroxy compound on heating with concentrated hydrochloric acid. The increased solubility of the new derivatives enhances their reduction to 4-aminopyrimidines over Raney nickel catalyst with higher yields than with the 2-thiol compound.

The 2-carboxymethylthio derivatives may be readily treated with ammonia or an amine at a temperature of about 125° to 130° C. to replace the carboxymethylthio radical with an amino group. If desired, the formation of the 2-carboxymethylthio derivative may take place in situ by reacting the 2-thiol-4-aminopyrimidine compound with chloracetic acid and after solution occurs heating the reaction product with ammonia in a sealed tube and recovering the product. The following examples are illustrative of the invention:

Example 1

1 gm. of 2-thiol-4-tetradecylaminopyrimidine and 0.5 gm. chloracetic acid were refluxed with 25 cc. of water until the solids dissolved in the solution. This required a period of from about 1½ to 2 hours. The aqueous solution was then chilled, causing fine needles to separate which were recrystallized from aqueous ethanol resulting in nearly quantitative yield of the 2-carboxymethylthio-4-tetradecylaminopyrimidine consisting of fine needles having a M. P. of 118° to 119° C.

Example 2

5 gm. of 2-thiol-4-anilinopyrimidine and 3 gm. of chloracetic acid (20% excess) were heated under reflux conditions with 25 cc. of water until solution occurred. When the aqueous solution was cooled 6.2 gm. of the 2-carboxymethylthio-4-anilinopyrimidine crystallized having a M. P. of 197° C. This was practically a quantitative yield of the theoretical amount.

Example 3

1 gm. of 2-thiol-4-aminopyrimidine and 1 gm. of chloroacetic acid were dissolved in 50 cc. of water and the aqueous solution evaporated to dryness. The residue was dissolved in 5 cc. of water and neutralized with 2N NaOH. The solution was filtered and acidified with acetic acid whereupon 1.4 gm. of the 2-carboxymethylthio-4-aminopyrimidine crystallized having a M. P. of 220° C. and comprising 96 percent of the theoretical yield.

Example 4

1.5 gm. of 2-thiol-6-methyl-4-aminopyrimidine was heated with 1 gm. of chloracetic acid in 10 cc. of water until the solids dissolved in the solution. The 2-carboxymethylthio-6-methyl-4-aminopyrimidine separated from the solution while still boiling. It was recrystallized from aqueous solution in the form of needles having a M. P. of 256° C.

Example 5

1 gm. of 2-thiol-6-methyl-4-anilinopyrimidine was refluxed with an aqueous solution of 0.5 gm. of chloracetic acid in 5 cc. of water until the base went into solution. Refluxing was continued for a period of one-half hour and the solution treated with charcoal, filtered and cooled. The product which separated was recrystallized from water, producing the 2-carboxymethylthio-6-methyl-4-anilinopyrimidine in the form of colorless needles having a M. P. of 188° to 189° C.

Example 6

2-carboxymethylthio-4-p-methoxyanilinopyrimidine was prepared exactly according to the method of the preceding example and recovered in the form of colorless needles having a M. P. of 118° to 119° C.

Example 7

1 gm. of 2-thiol-5-methyl-4-anilinopyrimidine was heated with a solution of 0.5 gm. chloracetic acid in 5 cc. of water for a period of two hours. When the solution was cooled the product did not separate, but when the solution was concentrated to 2 cc., and 1 cc. of concentrated hydrochloric acid added, the 2-carboxymethylthio-5-methyl-4-anilinopyrimidine hydrochloride having a M. P. of about 210° C. crystallized in good yield.

Example 8

0.75 gm. of 2-thiol-4-piperidinopyrimidine was refluxed with an aqueous solution of 0.38 gm. chloracetic acid in 10 cc. of water until solution was completed. The solution was filtered and allowed to stand overnight whereupon the 2-carboxymethylthio-4-piperidinopyrimidine hydrochloride separated in the form of prisms having a M. P. of 199° C.

Further examples of compounds coming within the scope of the invention readily prepared by the outlined procedures are as follows:

(1) 2-carboxymethylthio-6-methyl-4-eicosylmethylaminopyrimidine.

(2) 2-carboxymethylthio-4-eicosylaminoquinazoline.

(3) carboxymethylthio-5-benzyl-6-phenyl-4-diethylaminoethylaminopyrimidine.

(4) 2-carboxymethylthio-5-benzyl-6-p-methoxyphenyl-4-β-hydroxyethylaminopyrimidine.

(5) 2-carboxymethylthio-6-n-propyl-4-(1'-piperindo) pyrimidine.

(6) 2-carboxymethylthio-6-n-propyl-5-benzyl-4-(4'-methylpiperazino-1') pyrimidine.

(7) 2-carboxymethylthio-5-benzyl-6-n-propyl-4-(4'-benzylpiperazino-1') pyrimidine.

(8) 2-carboxymethylthio-5-γ-phenylpropyl-6-phenyl-4-n-amylaminopyrimidine.

(9) 2-carboxymethylthio-5-benzyl-6-n-propyl-4-n-tetradecylaminopyrimidine.

(10) 2-carboxymethylthio-6-n-octyl-4-methyllaurylaminopyrimidine.

(11) 2-carboxymethylthio-5-benzyl-6-p-chlorophenyl-4-o-methoxybenzylaminopyrimidine

(12) 2-carboxymethylthio-6-(3',4'-dimethoxyphenyl)-4-anisylmethylaminopyrimidine.

(13) 2-carboxymethylthio-6-phenyl-4-benzylmethylaminopyrimidine.

(14) 2-carboxymethylthio-6-n-propyl-4-methylhomopiperonylaminopyrimidine.

(15) 2-carboxymethylthio-5-veratryl-6-n-propyl-4-methylaminopyrimidine.

(16) 2-carboxymethylthio-6-(3',4'-dimethoxyphenyl)-4-(4'-morpholino) pyrimidine.

(17) 2-carboxymethylthio-6-p-tolyl-4-dimethylaminopyrimidine.

(18) 2-carboxymethylthio-5-ethyl-6-phenyl-4-octadecylaminopyrimidine.

(19) 2-carboxymethylthio-6-n-propyl-4-methylhomoanisylaminopyrimidine.

(20) 2-carboxymethylthio-6-n-propyl-4-methylhomoveratrylaminopyrimidine.

(21) 2-carboxymethylthio-5-ethyl-6-methyl-4-homoveratrylaminopyrimidine.

(22) 2-carboxymethylthio-5-n-butyl-6-methyl-4-homoanisylaminopyrimidine.

(23) 2-carboxymethylthio-5-benzyl-6-methyl-4-homopiperonylaminopyrimidine.

(24) 2-carboxymethylthio-4-homopiperonylamino quinazoline.

(25) 2-carboxymethylthio-4-p-bromoanilino quinazoline.

(26) 2-carboxymethylthio-4-o-chloroanilino quinazoline.

The new compositions are valuable intermediaries in the preparation of other 2 substituted 4-aminopyrimidine derivatives as the replacement of the carboxymethylthio groups is nearly quantitative as distinguished from the lower yields obtained in treatment of the 2-thiol derivative. The following examples illustrate the replacement of the carboxylmethylthio group by substituents:

*Example 9*

1.5 gm. of 2-thiol-6-methyl-4-n-amylaminopyrimidine was mixed with a solution of 0.7 gm. of chloracetic acid in 5 cc. of water and refluxed until completely dissolved. The mixture was refluxed for an additional half hour, and when cooled no separation occurred. The solution was then heated with 20 cc. of a 30 percent ammonia solution in a sealed tube at 130° to 140° C. for twenty-four hours. On cooling an oil separated, which, on recrystallization from aqueous ethanolic solution, was 2-amino-6-methyl-4-n-amylaminopyrimidine in the form of needles having a M. P. of 99° C.

*Example 10*

The 2-carboxymethylthio-4-piperidinopyrimidine hydrochloride of Example 8 was heated with ammonia in aqueous solution, causing 2-amino-4-piperidinopyrimidine to crystallize in the form of plates having a M. P. of about 142° C.

*Example 11*

2 - carboxymethylthio - 6 - methyl - 4 - aminopyrimidine, prepared in accordance with the method of Example 4, was heated with concentrated hydrochloric acid which quantitatively yielded 2-hydroxy-6-methyl-4-aminopyrimidine.

*Example 12*

2 - carboxymethylthio - 4 - anilinopyrimidine was dissolved in aqueous alcoholic solution and refluxed over Raney nickel catalyst to quantitatively yield 4-anilinopyrimidine.

We claim:
1. A compound having the formula

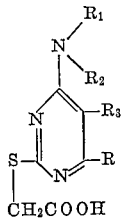

wherein R is selected from the class consisting of H, alkyl, aryl and aralkyl radicals, containing not over 8 carbon atoms, $R_1$ is selected from the class consisting of H, alkyl, aryl and aralkyl radicals, containing not over 20 carbon atoms, $R_2$ is selected from the class consisting of H and the methyl group, $R_1$ and $R_2$ are joined to form a heterocyclic compound selected from the class consisting of piperidino, piperazino and morpholino groups, $R_3$ has the same value as R and contains not over 10 carbon atoms, and $R_3$ and R are joined to form, together with the pyrimidine ring, a quinazolyl radical and where at least one of the substituents $R_2$ and $R_3$ is hydrogen.

2. The method of preparing carboxymethylthio substituted pyrimidine compounds which comprises treating a compound of the formula

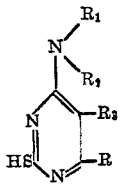

wherein R is selected from the class consisting of H, alkyl, aryl and aralkyl radicals, containing not over 8 carbon atoms, $R_1$ is selected from the class consisting of H, alkyl, aryl and aralkyl radicals, containing not over 20 carbon atoms, $R_2$ is selected from the class consisting of H and the methyl group, $R_1$ and $R_2$ are joined to form a heterocyclic compound selected from the class consisting of piperidino, piperazino and morpholino groups, $R_3$ has the same value as R and contains not over 10 carbon atoms, and $R_3$ and R are joined to form, together with the pyrimidine ring, a quinazolyl radical and where at least one of the substituents $R_2$ and $R_3$ is hydrogen, with chloracetic acid until solution occurs, cooling the mixture and recovering the 2-carboxymethylthio-4-aminopyrimidine.

3. A 2-carboxymethylthio-4-aminopyrimidine.

4. A 2-carboxymethylthio-4-amino quinazoline.

5. A 2-carboxymethylthio-4-piperidinopyrimidine.

6. A 2-carboxymethylthio-4-piperazinopyrimidine.

7. A 2-carboxymethylthio - 4 - morpholinopyrimidine.

8. The method of preparing 2-carboxymethylthiopyrimidine compound which comprises reacting a 2-thiol-4-aminopyrimidine with chloracetic acid and recovering the 2-carboxymethylthio-4-aminopyrimidine.

9. The method of preparing a 2-carboxymethylthio substituted pyrimidine compound which comprises reacting a 2-thiol-4-piperidinopyrimidine with chloracetic acid and recovering the 2-carboxymethylthio-4-piperidinopyrimidine.

10. The method of preparing a 2-carboxymethylthio substituted pyrimidine compound which comprises treating a 2-thiol-4-piperazinopyrimidine with chloracetic acid and recovering the 2-carboxymethylthio - 4 - piperazinopyrimidine.

11. The method of preparing a 2-carboxymethylthio substituted pyrimidine compound which comprises treating a 2-thiol-4-morpholinopyrimidine with chloracetic acid and recovering the 2-carboxymethylthio-4-morpholinopyrimidine.

GEORGE H. HITCHINGS.
PETER BYROM RUSSELL.

REFERENCES CITED

The following references are of record in the file of this patent:

UNITED STATES PATENTS

| Number | Name | Date |
| --- | --- | --- |
| 2,347,992 | D'Alelio et al. | May 2, 1944 |

FOREIGN PATENTS

| Number | Country | Date |
| --- | --- | --- |
| 309,102 | Great Britain | Apr. 2, 1929 |

OTHER REFERENCES

Johnson et al., Am. Chem. J., 40, p. 549 (1908).
Beilstein, Vierte auflage, vol. 24, page 352.